United States Patent [19]

Harris

[11] Patent Number: 5,110,396
[45] Date of Patent: May 5, 1992

[54] FLOATING AIR SEAL FOR AN APPARATUS FOR MANUFACTURING SINGLE FACED CORRUGATED BOARD

[75] Inventor: William W. Harris, Turnersville, N.J.
[73] Assignee: The Langston Corporation, N.J.
[21] Appl. No.: 538,292
[22] Filed: Jun. 14, 1990
[51] Int. Cl.⁵ ........................... B31F 1/28; B32B 31/08
[52] U.S. Cl. .................................. 156/382; 156/472; 156/473
[58] Field of Search .............. 156/470, 471, 472, 473, 156/382, 381; 277/173, DIG. 7, 175

[56] References Cited

U.S. PATENT DOCUMENTS

| | | | |
|---|---|---|---|
| 2,018,240 | 10/1935 | Swift, Jr. | 156/473 |
| 3,907,310 | 9/1975 | Dufour | 277/173 X |
| 4,261,784 | 4/1981 | Saito | 156/389 |
| 4,632,403 | 12/1986 | Ishitani | 277/173 X |

FOREIGN PATENT DOCUMENTS

| | | | |
|---|---|---|---|
| 58-78059 | 10/1983 | Japan | 277/173 |
| 64-36446 | 2/1989 | Japan | 156/382 |

Primary Examiner—Michael W. Ball
Assistant Examiner—Michele K. Yoder
Attorney, Agent, or Firm—Seidel, Gonda, Lavorgna & Monaco

[57] ABSTRACT

The invention is directed to a floating air seal for a cylindrical rotatable member having a sealing member adjacent to the rotatable member for preventing air from flowing between the seal and rotatable member, and resilient member for biasing said seal member towards a rotatable member. The floating air seal is preferably used in an apparatus for manufacturing single faced corrugated board.

9 Claims, 3 Drawing Sheets

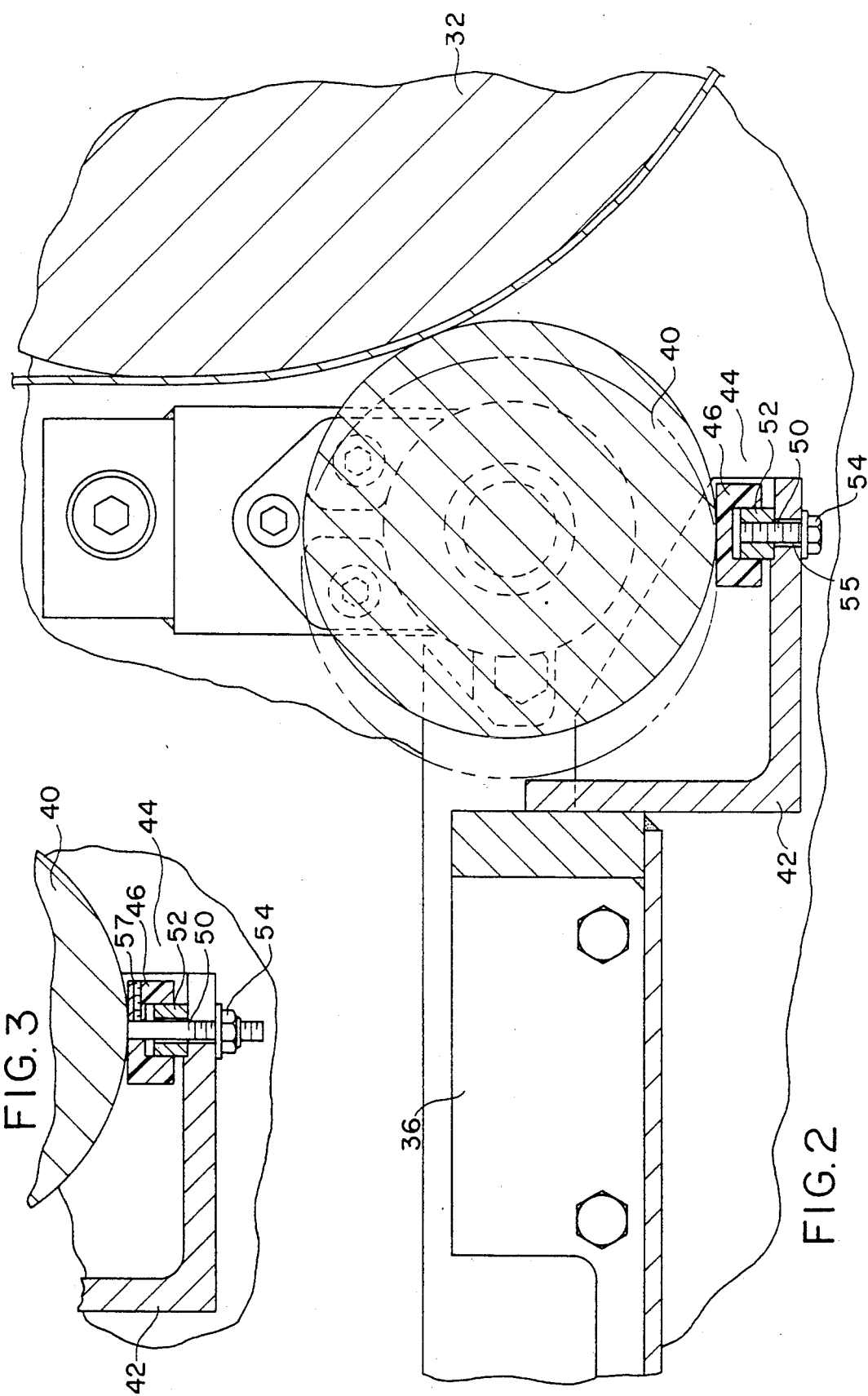

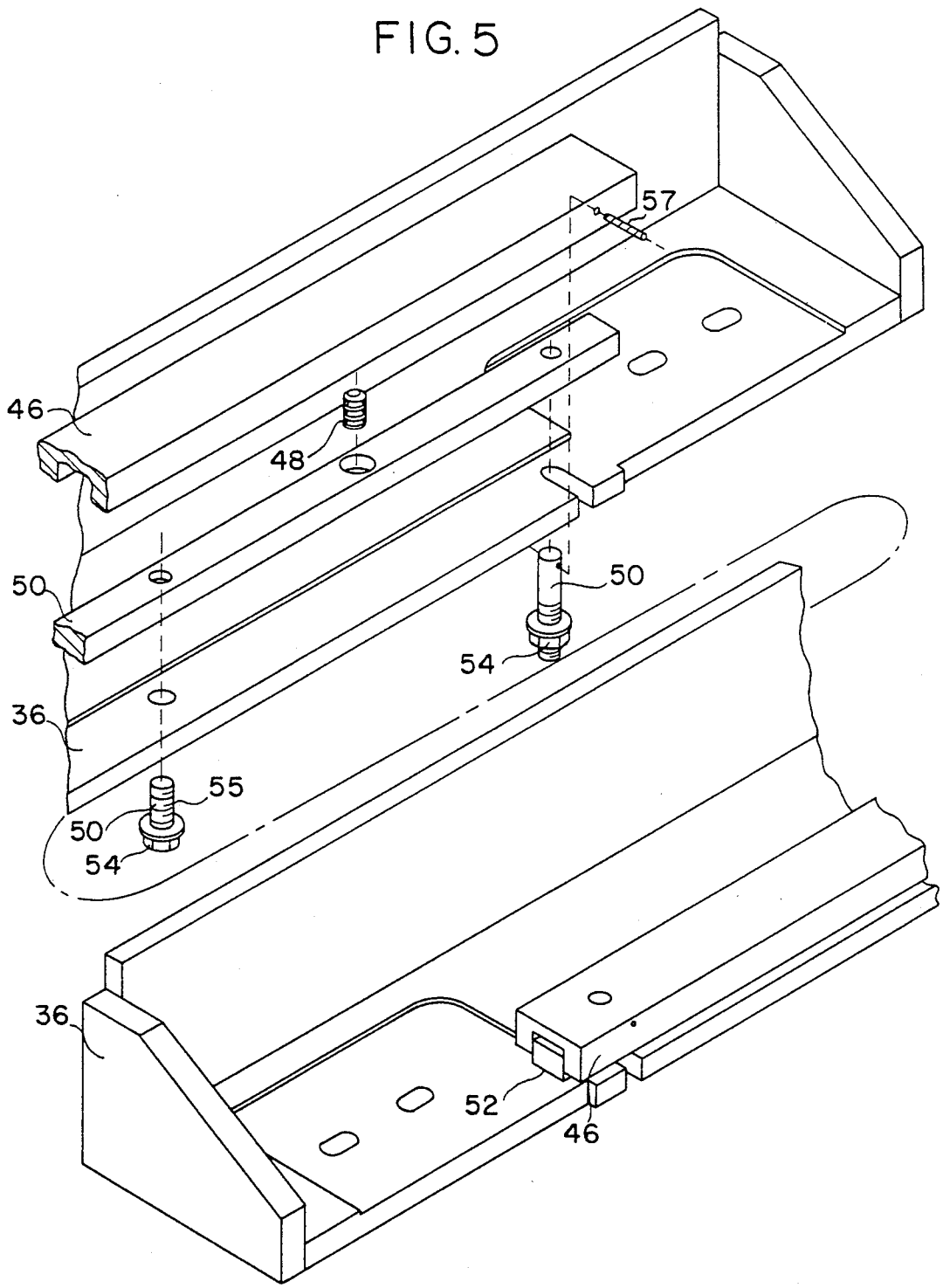

FLOATING AIR SEAL FOR AN APPARATUS FOR MANUFACTURING SINGLE FACED CORRUGATED BOARD

FIELD OF THE INVENTION

This invention is directed to a floating air seal which prevents excessive air losses in a positive-pressure apparatus for manufacturing single faced corrugated board.

BACKGROUND OF THE INVENTION

Single faced corrugated board is manufactured by gluing a liner to a corrugated medium under controlled conditions. A web of core material to be corrugated is passed through a pair of counter-rotating corrugating rollers. After the corrugated core leaves the corrugating rollers, a paste applicator applies an adhesive to the peaks of the corrugations. A web of liner material is faced to the pasted peaks of the corrugated material by a pressure roller co-operating with one of the corrugated rollers. The final product is a single faced corrugated board having the liner on one side of the corrugated core.

A common problem in manufacturing single faced corrugated board is maintaining the corrugated core flush against the corrugating roller as the roller rotates to carry the corrugated core to the nip between the corrugating roller and the pressure roller, where the liner is applied. The resilience of the core and centrifugal force caused by rotation of the corrugating rolls tends to cause the core to separate from the corrugating roller before it enters the nip, leading to bulges, wrinkles, poor liner adhesion and numerous other problems. Some attempts to solve this problem rely on mechanical devices to physically hold the core against the corrugating rollers. Some approaches use suction to hold the core against the rollers. Another method commonly used is to enclose the corrugating rollers, pasting unit and pressure roller in a chamber which is pressurized by air to a pressure sufficient to hold the core against the corrugating rollers. This approach eliminates problems with mechanical or vacuum systems, but requires the chamber to be sealed against excessive air leakage so that the desired pressure can be maintained in the chamber. In these systems, a seal roller is used in cooperation with the pressure roller. The liner passes between the seal roller and the pressure roller, sealing the entry point of the liner into the chamber. A seal assembly is required on the back side of the seal roller to prevent air leakage between the chamber and the surface of the seal roller.

Two types of seal assemblies are commonly used in this type of apparatus. The first type of seal assembly is a fixed beveled brass seal bar. The bar is mounted between the seal roller and the chamber. However, the beveled bar has many disadvantages. The bar cannot tolerate any thermal expansion relative to mating parts. Another problem occurs if the seal roller's surface is uneven, or has an out of round condition, because there will be a tendency for the roller to be obstructed by the seal bar. This could lead to excessive and uneven wear of the seal bar or the seal roller. In addition, there is no way to easily adjust the position of the bar.

The second type of seal assembly uses a cantilever-mounted, flexible spring steel blade having a brass wear strip attached to its outer edge. The flexible blade is bolted to a fixed structure of the apparatus. The blade is then extended in an upward direction at a 45° angle until it makes intimate contact with the seal roller. Unfortunately, the flexible spring steel strip assembly is almost invariably too flexible and unstable by its very nature, which results in an assembly which has a short service life and must be frequently replaced.

It is therefore an object of the invention to provide a floating seal assembly which effectively seals the pressure chamber of a positive-pressure single faced and which avoids the problems of known seals.

SUMMARY OF THE INVENTION

In its broadest aspects, the invention is directed to a floating air seal for a cylindrical rotatable member comprising a sealing means adjacent and generally tangent to the rotatable member for preventing air from flowing between the seal and the rotatable member, and resilient means for biasing said sealing means toward the member.

In a preferred embodiment, the invention is directed to an apparatus for manufacturing single-faced corrugated board comprising first and second corrugating rollers having an opening therebetween for receiving a web of core material to be corrugated. The second corrugating roller is hollow and has vented slots on its outer surface. Applicator means adjacent to the second corrugating roller apply an adhesive to the web of corrugated core material. A pressure roller is placed adjacent to the second corrugated roller for receiving a web of liner material. The liner material is faced to the corrugated material between the pressure roller and the second corrugated roller. A seal roller is placed adjacent to the pressure roller for guiding the liner material into the pressure chamber. A pressure chamber, partially defined by the first and second corrugating rollers, the pressure roller and the seal roller, applies a positive pressure to maintain the web of corrugated core material flush against the second roller. A floating air seal is positioned in intimate contact with the seal roller and comprises an elongated sealing member parallel to the axis of rotation of the seal roller and has a sealing surface sealingly engaging the circumferential surface of the seal roller substantially tangential thereto and resilient means for biasing the sealing member toward the seal roller.

The above and other objects, features and advantages of the invention will become more apparent from reading the following description of its preferred embodiment.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 2 is an enlarged sectional view taken through a first transverse plane showing the floating seal and seal roller of the present invention.

FIG. 3 is an enlarged sectional view taken through a second transverse plan showing the floating seal of the present invention.

FIG. 5 is an exploded isometric view of the floating seal of the present invention.

DESCRIPTION OF THE PREFERRED EMBODIMENT

Figure 1:
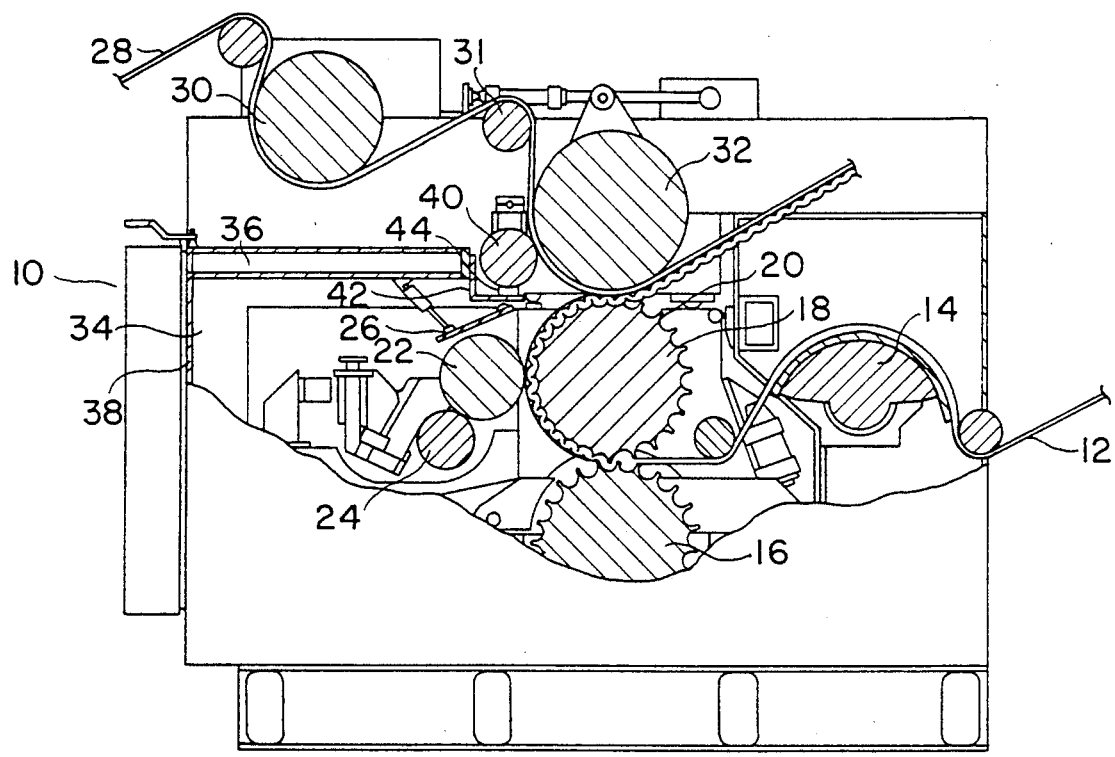
FIG. 1 is a schematic sectional view showing a positive-pressure single-facer employing the floating seal of the present invention.

FIG. 1 illustrates a pressurized single facer for manufacturing single faced corrugated board, designated by reference 10. A web of core material 12 enters the apparatus and passes over a steamer 14. The steamer 14 preconditions the web of core material so that the material becomes plasticized prior to entering the nip between counter-rotating first and second corrugating rollers 16 and 18. Both the first and second corrugating rollers 16, 18 have a number of longitudinal projections 20 parallel to their axis of rotation and along their outer surfaces which mesh with one another. As the web of core material 12 passes through the corrugating rollers 16, 18, the web is corrugated in known manner.

An adhesive applicator roller 22 is located adjacent the second corrugating roller 18. The applicator roller 22 picks up a coating of glue, or any other suitable adhesive, on its outer surface from a supply pan (not shown) and applies it to the peaks of the flutes of the web of non-corrugated core material 12 on the second corrugating roller 18. A meter roll 24 removes excess glue from the surface of the applicator roller 22 so that a uniform film of glue at a selected thickness can be applied to the web of core material 12. A glue deflector 26 is located above the applicator roller 22 and positioned at an angle to intercept any stray glue which may splash from the applicator roller 22.

A web of liner material 28 enters the apparatus 10 from the opposite side and is steamed on a preheater roller 30 to plasticize the web of liner material 28 in a manner similar to the web of core material. The web of liner material 28 is looped around a wrap roll 31 and from there enters the nip between a pressure roller 32 and a seal roller 40. The web of liner material 28 then moves to the nip between pressure roller 32 and second corrugating roller 18, where it is faced to the web of corrugated core material 12 in the nip between the pressure roller 32 and the second corrugating roller 18. To ensure that the first web of corrugated core material 12 and the web of liner material 28 move at the same speed, the pressure roller 32 is driven by the combined material, i.e., the first web of corrugated material 12 and the second web of liner material 28. The pressure and movements of the pressure roller 32 are controlled so that an even pressure is applied to the two webs.

In order to maintain the web of corrugated material 12 flush against the second corrugating roller 18, a positive air pressure is applied to the outer surface of the web of corrugated core material, causing the web of corrugated core material 12 to conform to the outer surface of the second corrugating roller 18. The side of the second corrugating roller 18 having the web of corrugating material 12 thereon is exposed to a positive pressure chamber 34.

The pressure chamber 34 is enclosed in part by a top structural member 36, a first end wall 38, a bottom structural member and two side seals (not shown) which are positioned in close proximity to one another. A second end wall is formed by the first and second corrugating rollers 16 and 18, the pressure roller 32 and the second seal roller 40. The first and second corrugating rollers 16 and 18, and the pressure roller 32 are aligned adjacent one another. A small opening exists in the second wall at the nip formed between the first and second corrugating rollers 16 and 18 for the web of core material 12 to be inserted therebetween. However, the opening prevents more than a minimal air loss from the pressure chamber 34. A second opening exists in the pressure chamber 34 at the nip formed between the pressure roller 32 and second corrugating roller for the web of core material 12 and the web of liner material 28 to be passed through. Again, the second opening prevents more than minimal air loss.

A seal roller 40 is pivotably mounted adjacent the pressure roller 32. Seal roller 40 is pivotably mounted, as shown best in FIG. 2, to accommodate variations in thickness of the web of liner material and variations in the radius of pressure roller 32. The seal roller 40 has two functions. Primarily, the seal roller 40 is used to prevent air loss between the top structural member 36 and the pressure roller 32. A secondary function of the seal roller 40 is to maintain the web of liner material 28 flush against the pressure roller 32.

Figure 4:
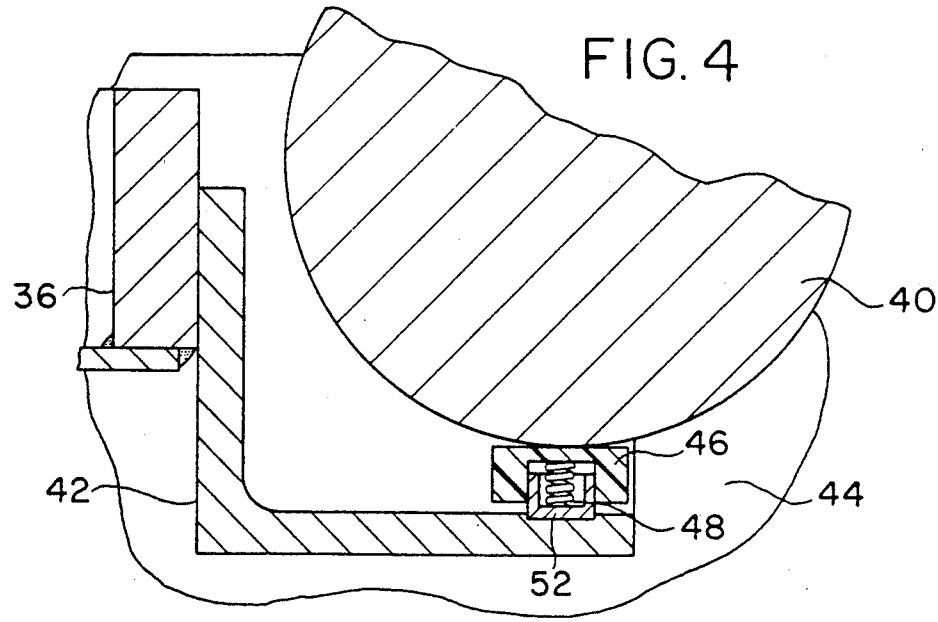
FIG. 4 is an enlarged sectional view taken through a third transverse plane showing the floating seal of the present invention.

An L-shaped structural member 42, as seen enlarged in FIGS. 2-4 is provided and extends from the top structural member 36 to support a floating seal 44 adjacent the seal 40. The floating seal 44 is placed in close proximity to the seal roller 40 to prevent air loss between the back of the seal roller 40 and the top structural member 36 and completes the pressure chamber 34.

A positive air pressure is provided in the pressure chamber 34 by a blower (not shown) or any other suitable means. The positive air pressure is directed to the side of the second corrugating roller 18 having the web of core material thereon to provide a pressure differential between the pressure chamber 34 and the interior of the second corrugating roller 18 so that the web of core material 12 remains in intimate contact with the second corrugating roller 18 until the web of liner material 28 is applied to the web of corrugated materials surface. In order to provide a sufficient positive air pressure, it is necessary to minimize air loss in the pressure chamber 34.

In order to provide a sufficient pressure differential between the outer surface of the first web of material and the inner surface of the first web of corrugated material 12, the second corrugating roller 18 is hollow and has vented slots on its outer surface (not shown).

It is important to minimize air loss. Most of the potential air loss from chamber 34 occurs between the back of the seal roller 40 and the top structural member 36. The air loss in this area is greatly minimized by the floating air seal 44.

Referring to FIGS. 2-5, the floating seal 44 comprises an elongated U-shaped bar 46, preferably made of bronze. The U-shaped bar 46 is situated parallel to the axis of rotation of the seal roller 40 and is in intimate contact with the circumferential surface of the seal roller 40, along the entire length of the seal roller 40. At least one compression spring 48 (see FIG. 4) is seated within the U-shaped opening of the sealing member 46 to bias the sealing bar 46 toward the seal roller 40. Alternately spaced between the compression springs 48 are adjusting studs 50 attached to the seal member 46 to control the position of the seal 44 relative to the seal roller 40. Positioned beneath the compression springs 48 and adjusting studs 50 is a guide bar 52, preferably of steel. Guide bar 52 is mounted to structural member 42 by hex head bolts 55. The guide bar 52 retains the compression springs 48 and adjusting studs 50 in alignment and is positioned within the U-shaped opening of the seal member 46. A series of adjusting nuts 50 on the bottom of the L-shaped structural member 42 cooperate with the adjusting studs 50 to adjust the position of sealing member 46. Seal member 46 is firmly attached to studs 50 by set screws 57. As seen in the figures, the threaded studs 50 are secured to the sealing bar 46 and extend through structural member 36. The studs each have a nut 54 threaded thereon. When tightened, the nuts 54 act to pull the sealing bar away from roller 40 against the action of the resilient springs 48. conversely, when loosened, nuts 54 allow the sealing bar 46 to move closer to the roller under the action of the springs 48. Each spring 48 is seated in a recess (unnumbered) in the guide bar 52 (see FIG. 5) and bears on the central portion of the sealing bar 46 facing the guide bar 52. Guide bar 52, received in the U-shaped cross-section of sealing bar 46, acts to guide the sealing bar in movement toward and away from the roller while at the same time constraining the sealing bar 46 against lateral movement.

The adjusting studs 50 and nuts 54 are set up so that the compression springs 48 are initially slightly compressed, thus establishing the minimum tension of the floating seal 44. The nuts 54 can be further advanced around the adjusting studs 50 to further compress the springs 48 and increase the tension of the seal. The compression of the springs 48 determines the amount of resiliency the seal 44 has relative to the seal roller 40. In addition, depending on the setting of the nuts 54, the studs limit movement of the seal 44 toward roller 40. Thus, the seal 44 can be appropriately positioned so as to accommodate thermal expansion of the parts during use.

The floating seal 44 prevents air losses between the seal roller 40 and the top structural member 36. The floating seal 44 is in intimate contact with the seal roller 40 on its circumferential surface and is generally tangential to the seal roller 40. Because the floating seal is resilient, it can work effectively under out of round conditions, i.e., when the roller surface is not perfectly smooth, and is able to tolerate thermal expansion of surrounding parts. The seal 44 is also able to effectively maintain contact with seal roller 40 as seal roller 40 pivots to accommodate variations in web thickness and in radius of the pressure roller (i.e., out of round condition).

The present invention may be embodied in other specific forms without departing from the spirit or essential attributes thereof and, accordingly, reference should be made to the appended claims, rather than to the foregoing specification, as indicating the scope of the invention.

I claim:

1. An apparatus for manufacturing single faced corrugated board comprising:
    a first corrugating roller;
    a second corrugating roller adjacent said first corrugating roller having an opening therebetween for receiving a first web of material to be corrugated, said second corrugating roller being hollow and having vented slots on its outer surface;
    applicator means adjacent said second corrugating roller for applying an adhesive to said first web of corrugated material;
    a pressure roller placed adjacent said second corrugating roller for receiving a second web of liner material, said liner material faced to said corrugated material between said pressure roller and said corrugated roller;
    a seal roller placed adjacent said pressure roller for guiding said liner material along said pressure roller;
    a pressure chamber partially defined by said first and second corrugating rollers, said pressure roller and said seal roller, said chamber applying a positive air pressure to maintain said web of core material flush against said second corrugating roller; and
    a floating air seal positioned in intimate contact with said seal roller and comprising
        (i) an elongated sealing member parallel to the axis of rotation of said seal roller and having a sealing surface sealingly engaging the circumferential surface of said seal roller substantially tangential thereto, and
        (ii) resilient means for biasing said sealing member toward said seal roller.

2. An apparatus according to claim 1 wherein said elongated sealing member is U-shaped, said member's U-shaped opening facing said resilient means and said member's opposite surface being adjacent to said seal roller.

3. An apparatus according to claim 2 wherein said resilient means comprises at least one compression spring and adjusting stud positioned alternately within said U-shaped portion of said sealing member.

4. An apparatus for manufacturing single faced corrugated board comprising:
    a first corrugated roller;
    a second corrugating roller adjacent said first corrugating roller having an opening therebetween for receiving a first web of material to be corrugated, said second corrugating roller being hollow and having perforations on its outer surface;
    applicator means adjacent said second corrugating roller for applying an adhesive to said first web of corrugated material;
    a pressure roller placed adjacent said second corrugating roller for receiving a second web of liner material, said liner material faced to said corrugated material between said pressure roller and said corrugated roller;
    a seal roller placed adjacent said pressure roller for guiding said liner material along said pressure chamber;
    a pressure chamber defined by a top structural member, a bottom structural member, two side seal members, a first end wall, and a second end wall defined by said first and second corrugating rollers, said pressure roller and said seal roller, said chamber applying a positive air pressure to maintain said web of core material flush against said second corrugating roller; and
    a floating air seal positioned in intimate contact with said seal roller and comprising
        (i) an elongated U-shaped sealing member parallel to the axis of rotation of said seal roller and having a sealing surface opposite said U-shaped opening for sealingly engaging the circumferential surface of said seal roller substantially tangential thereto, and
        (ii) at least one compression spring and adjusting stud positioned alternately for biasing said sealing member toward said seal roller.

5. An apparatus for manufacturing single faced corrugated board comprising a first corrugating roller; a second corrugating roller adjacent to the first corrugating roller for corrugating a first web in cooperation with the first corrugating roller, the second corrugating roller being hollow and having vented slots on its outer surface; applicator means adjacent to the second corrugating roller for applying an adhesive to the peaks of the corrugations formed in the first web; a pressure roller adjacent to the second corrugating roller for receiving a second web of liner material and for applying it to the corrugated first web; a seal roller adjacent to the pressure roller for guiding the said liner material along the pressure roller; a pressure chamber partially defined by the first and second corrugating rollers, the pressure roller and the seal roller, said chamber applying a positive air pressure to maintain the first web on the second corrugating roller; and an air seal adjacent to the seal roller and comprising an elongated sealing member parallel to the axis of rotation of the seal roller and having a sealing surface substantially tangential to the seal roller and slightly spaced form the seal roller, and including resilient means for urging the sealing member towards the seal roller.

6. An apparatus according to claim 5, in which the sealing member comprises a sealing bar for operating with the surface of the seal roller, means for guiding the bar so that it can move toward and away from the roller, a plurality of resilient devices for urging the bar toward the roller, and a plurality of adjustable retaining devices for adjustably limiting movement of the bar toward the roller.

7. An apparatus according to claim 6, in which the retaining devices comprise threaded studs which are secured to the sealing bar and extend through a support member, and a nut on each stud which, when tightened, acts to pull the sealing bar away from the roller against the action of the resilient devices, and conversely when loosened allows the sealing bar to move closer to the roller under the action of the resilient devices.

8. An apparatus according to claim 7, in which the sealing bar is U-shaped in cross-section and fits over a guide bar which is secured to the support member and guides the sealing bar in movement toward and away from the roller while constraining the sealing bar against lateral movement.

9. An apparatus according to claim 8, in which there are a plurality of resilient devices in the form of compression springs at intervals along the sealing bar, each compression spring being seated in a recess in the guide bar and bearing on the central portion of the sealing bar facing the guide bar.

* * * * *